Oct. 17, 1967 P. JÖRGENSEN 3,348,199

ELECTRICAL COMPARATOR CIRCUITRY

Filed April 1, 1965 4 Sheets-Sheet 1

INVENTOR.
PIERRE JÖRGENSEN

BY *Bauer and Seymour*
ATTORNEYS

PASSAGE PURE BINARY → REFLECTED BINARY

PASSAGE REFLECTED BINARY → PURE BINARY

INVENTOR.
PIERRE JÖRGENSEN
BY
*Bauer and Seymour*
ATTORNEYS

Oct. 17, 1967 P. JÖRGENSEN 3,348,199

ELECTRICAL COMPARATOR CIRCUITRY

Filed April 1, 1965 4 Sheets-Sheet 3

INVENTOR.
PIERRE JÖRGENSEN

BY

Bauer and Seymour
ATTORNEYS

ELECTRICAL COMPARATOR CIRCUITRY

Filed April 1, 1965 4 Sheets-Sheet 4

INVENTOR.
PIERRE JÖRGENSEN
BY Bauer and Seymour
ATTORNEYS 3,348,199

ELECTRICAL COMPARATOR CIRCUITRY

Pierre Jörgensen, L'Hay-les-Roses, France, assignor to Compagnie de Saint-Gobain, Neuilly-sur-Seine, Seine, France Filed Apr. 1, 1965, Ser. No. 444,642
Claims priority, application France, Apr. 3, 1964, 969,694
14 Claims. (Cl. 340—146.2)

This invention relates to electrical apparatus and more particularly to electrical comparator circuitry adapted among other things for use in automatic computers.

One of the objects of the present invention is to provide novel electronic circuitry for making comparisons of the magnitude, sign or phase of two voltages.

Another object of the invention is to provide novel transistorized circuitry for making comparisons of the above nature.

Still another object is to provide novel components of electrical circuitry for carrying out logical comparisons of two signals for purposes of conversion, verification and the like in automatic calculators.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

Figure 1:
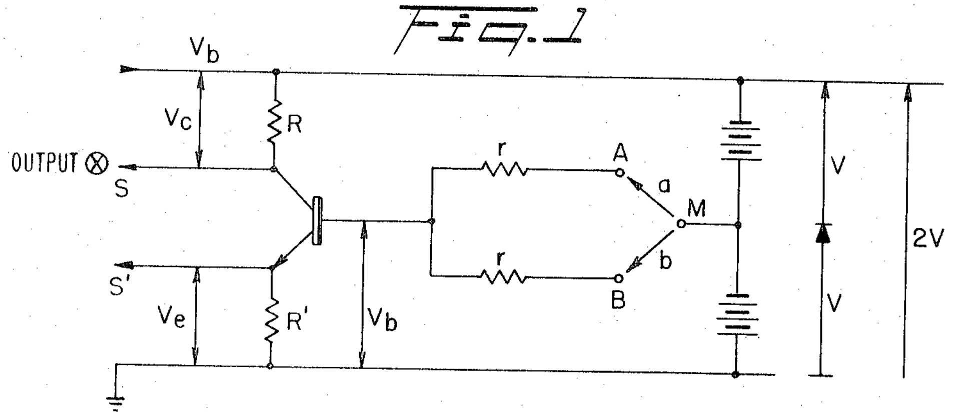
FIG. 1 is a schematic wiring diagram illustrating one form of electrical circuit embodying the invention.
Figure 7:
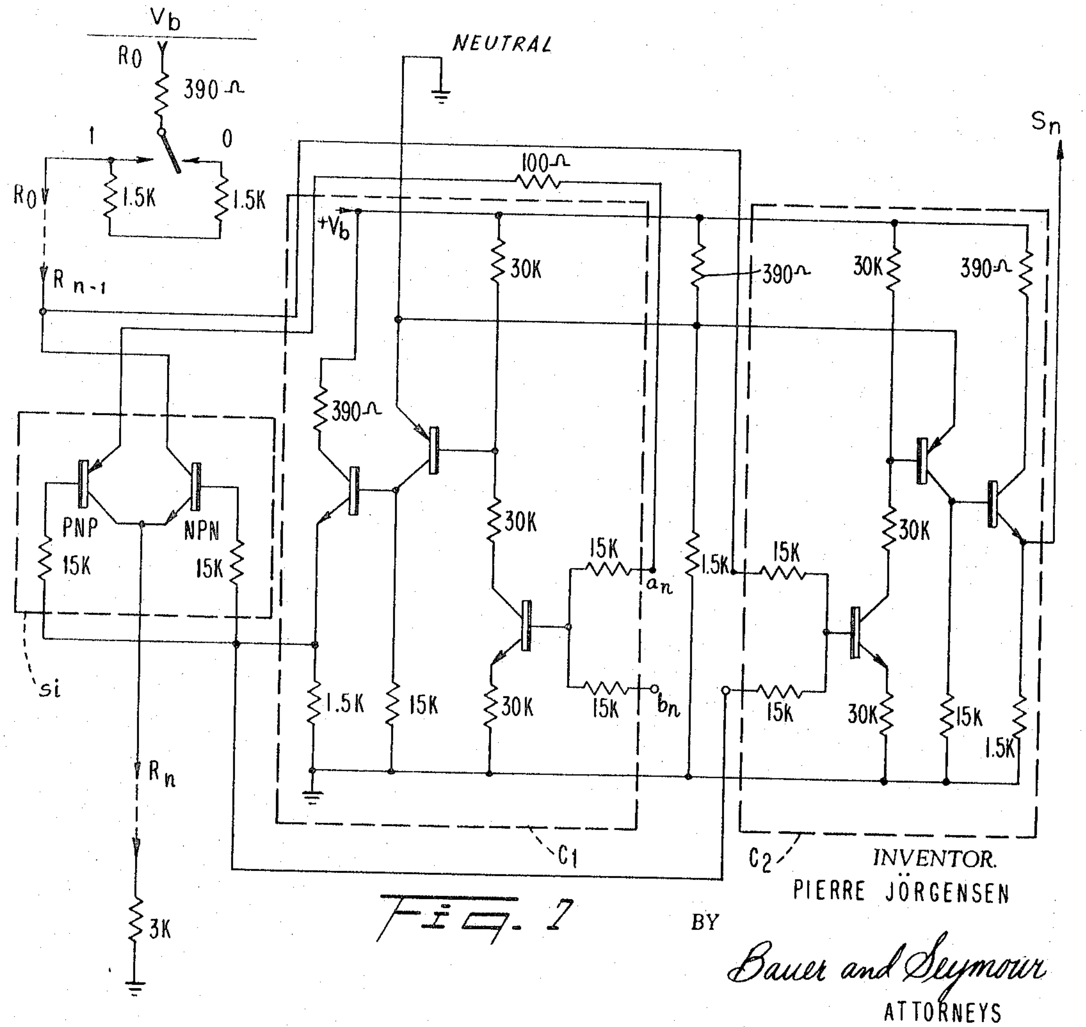
FIG. 7 is a schematic diagram illustrating a detailed practical example of the embodiment of FIG. 6.
Figures 8A, 8B, 8C:
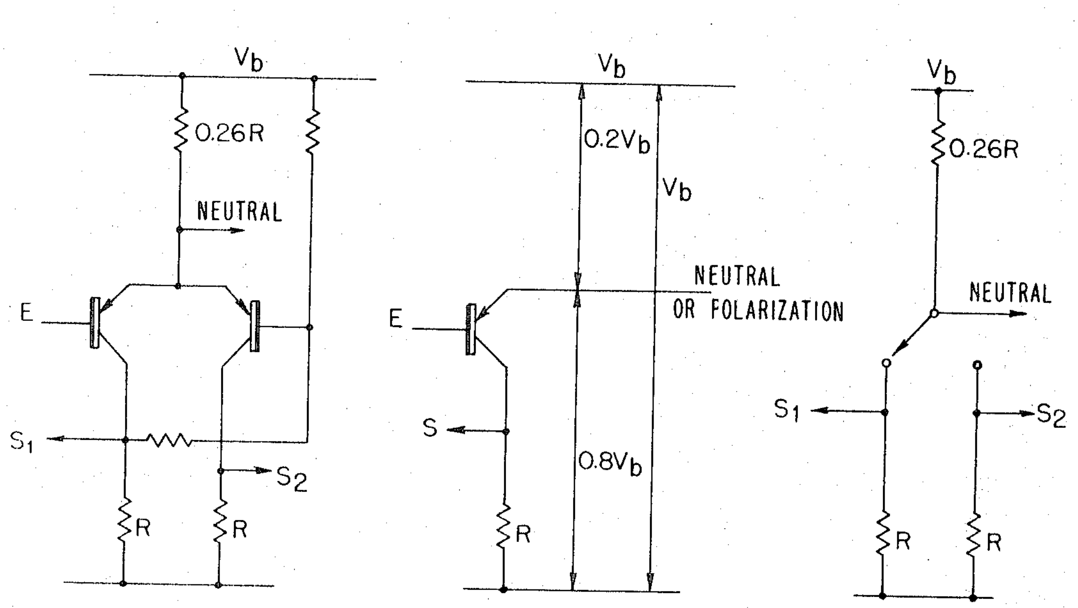
Figure 9:
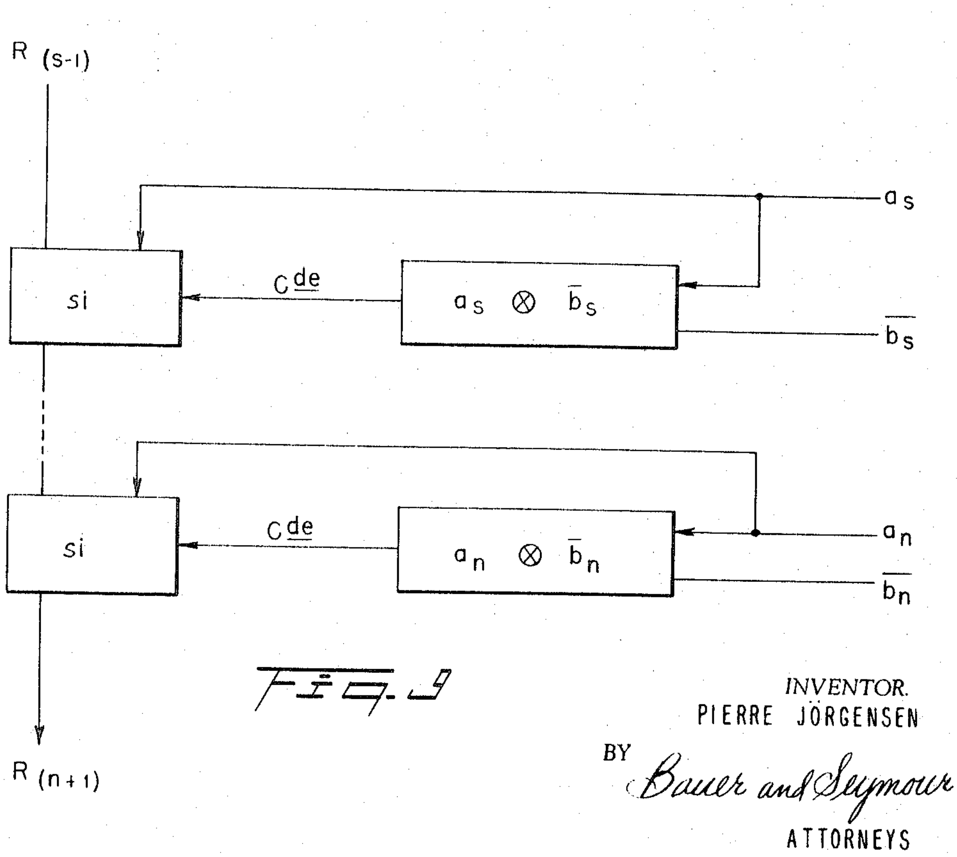

FIGS. 8(*a*), 8(*b*) and 8(*c*) are schematic wiring diagrams of known circuit components which may be used advantageously in combination with the circuitry of FIG. 7; and FIG. 9 is a block diagram illustrating another use for circuits of the type shown in FIG. 1.

One embodiment of the comparator circuit contemplated by the invention is illustrated, by way of example, in FIG. 1 as comprising a transistor having the base terminal thereof connected to the system input terminals A and B, each through a resistor $r$. The resistors $r$ preferably have identical values. The collector terminal of the transistor is shown connected to an output line S and to a source of voltage $V_b$ through a resistance R. The emitter terminal of the transistor is connected to an output line S' and also to ground through a resistance R'. The resistances R and R' are preferably of identical value and have high resistance values as compared to those of resistors $r$.

For the purpose of facilitating the explanation and comprehension of the operation of the novel comparator circuit described above and illustrated in FIG. 1, a point M is illustrated as being polarized by two batteries, each of which yields a voltage $+v$. Upon establishing a voltage $a$ between point M and terminal A and a voltage $b$ between point M and terminal B, these voltages may in principle be $+v$, representing the binary number 1 and $-v$, representing the binary number 0 or comparable symbols. Thus, with respect to point M the base terminal of the transistor is brought to the following voltages depending upon the value of the comparative voltages $a$ and $b$.

$-v$ if $a=b=-v$
0 (if $a=-v$, $b=+v$), or (if $a=+v$, $b=-v$)
$+v$ if $a=b=+v$

It follows from the above relations that the $v_b$ between said base terminal of the transistor and the frame or ground is, respectively:

$$-v+v=0$$
$$0+v=v$$
$$+v+v=2v$$

This results in the fact, which is essential in the circuit illustrated in FIG. 1, that the voltage $v_c$ at the terminals of resistance R in the collector circuit will be, respectively:

0 if $a$ and $b$ are identical
$+v$ if $a$ and $b$ are different

The novel circuit contemplated by the invention thus operates to produce the factor $a \otimes b$ or the aglebraic product of the characters. It will be noted, furthermore, that this novel circuit also achieves the logical operation "OR" if the signal is picked up at S' from the emitter terminal of the transistor instead of at S from the collector terminal. The voltage $v_e$ between S' or the frame is zero if the two input voltages $a$ and $b$ are zero, and it is other than zero if at least one of the input voltages $a$ or $b$ is other than zero.

In other words, a circuit constructed in accordance with FIG. 1 upon receiving two binary digits $a$ and $b$ represented by two voltages $-v$ and $+v$ indicates whether these voltages and hence, the digits represented thereby, are identical or different by issuing an output voltage which may take on one value to represent equality and another value to represent inequality of the input voltages.

The illustrated circuit thus functions like those which, in Boolean algebra, are referred to by various terms (new with respect to conventional algebra), such as addition modulus 2, dilemma, "OR" exclusive, and "OR" disjunctive. The operations carried out by such circuits are indicated as a rule by the notations $$a \otimes b \text{ or } a \cup b$$

I shall use herein the first of these notations to indicate the algebraic product of the characters or symbols.

In summary, by considering $-v_c=a \otimes b$, the operation performed by the novel circuit of FIG. 1 may be tabulated as follows, using the binary numbers 0 and 1:

| | | | | |
|---|---|---|---|---|
| Input | | | | |
| $a$ | 0 (or −) | 1 (or +) | 0 (or −) | 1 (or +) |
| $b$ | 0 (or −) | 0 (or −) | 1 (or +) | 1 (or +) |
| Output | | | | |
| $-v_c=a \otimes b$ | 1 (or +) | 0 (or −) | 0 (or −) | 1 (or +) |
| algebraic meaning | equal = | different ≠ | | equal = |

Circuits caming within the scope of the invention may be employed in a variety of ways for carrying out different operations in automatic computers and the like. Several uses of such circuits alone or in combination with other circuit components are hereinafter discussed.

In binary calculations, it is frequently necessary to obtain a restricted complement of a binary number by changing each 1 of the number to 0 and each 0 to 1. This operation may be achieved with circuitry shown in FIG. 2, wherein each block or rectangle represents a circuit embodying the invention as illustrated in FIG. 1, and one such circuit is assigned to each digit $a$ of the binary number A to be complemented. A voltage representative of the digit is applied at input terminal A and a control voltage C is applied at input terminal B of each circuit.

Figure 2:
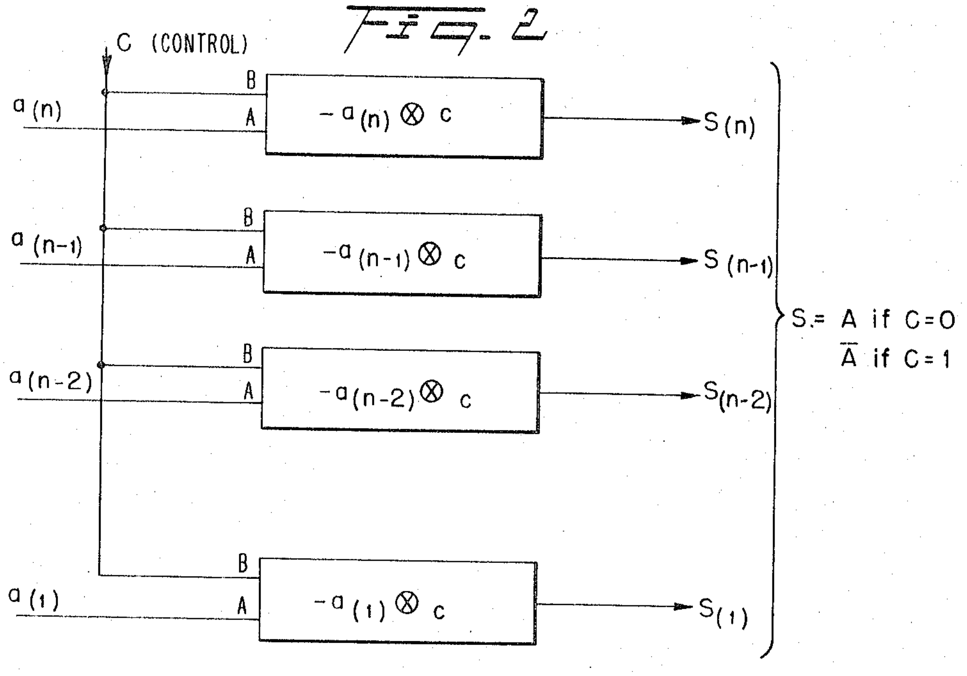
FIGS. 2 to 6 are schematic block diagrams illustrating different uses of the circuitry shown in FIG. 1.

The logical equation for the circuitry of FIG. 2 in terms of output S is $$S=\begin{cases}A \text{ if } C=0\\ \bar{A} \text{ if } C=1\end{cases}$$

The operations performed by such a circuit may be summarized and tabulated as follows:

| C= | | 0 (or −) | 1 (or +) |
|---|---|---|---|
| a= | 0 (or −) | 1 (or +) | 0 (or −) |
| | 1 (or +) | 0 (or −) | 1 (or +) |

Figure 3:
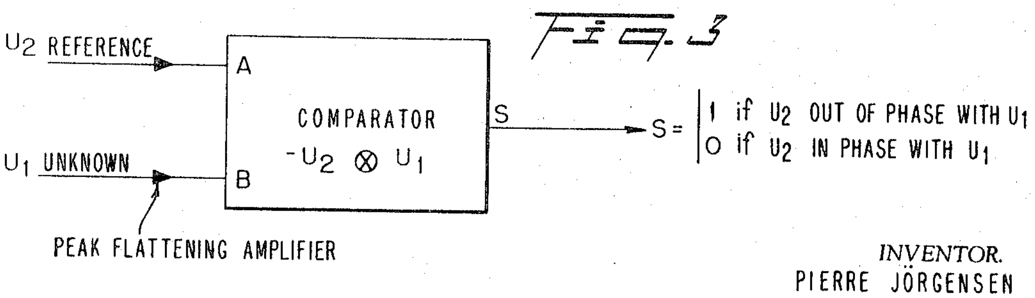

A comparator circuit embodying the invention may also be used to determine the phase relationship of two alternating current voltages, as indicated by the diagram of FIG. 3 wherein the circuit of the invention is diagrammatically represented by the rectangle. An alternating reference voltage $U_2$ having an amplitude $v$ is fed in at terminal A, and an unknown alternating current voltage $U_1$ is fed in at input terminal B. The unknown voltage may be altered by suitable means, such as a peak flattening amplifier, to bring the amplitude thereof to the same level as that of reference voltage $U_2$. At the outlet S, one obtains a direct current voltage equal to $+v$ representing the binary number 1 if the two input voltages are out of phase and a direct current voltage of zero representing the binary number 0 if the two alternating voltages are in phase. A phase difference or shift intermediate the in-phase and out-of-phase relationships of the two input voltages will be indicated by an output voltage lying between 0 and $v$.

The invention may also be employed to effect the rapid conversion of a pure binary number into a reflected binary. The coded number as a reflected binary $B_{r(n)}$ (of rank or position $n$) is derived from numbers coded in pure binary $B_{p(n+1)}$ and $B_{p(n)}$ (of rank $n+1$ and $n$, respectively) according to the law:

$$B_{r(n)}=B_{p(n+1)}\otimes B_{p(n)}$$

or expressed algebraically:

$$B_{r(n)}=\begin{cases}1 \text{ if } B_{p(n+1)}\neq B_{p(n)}\\ 0 \text{ if } B_{p(n+1)}=B_{p(n)}\end{cases}$$

Figure 4:
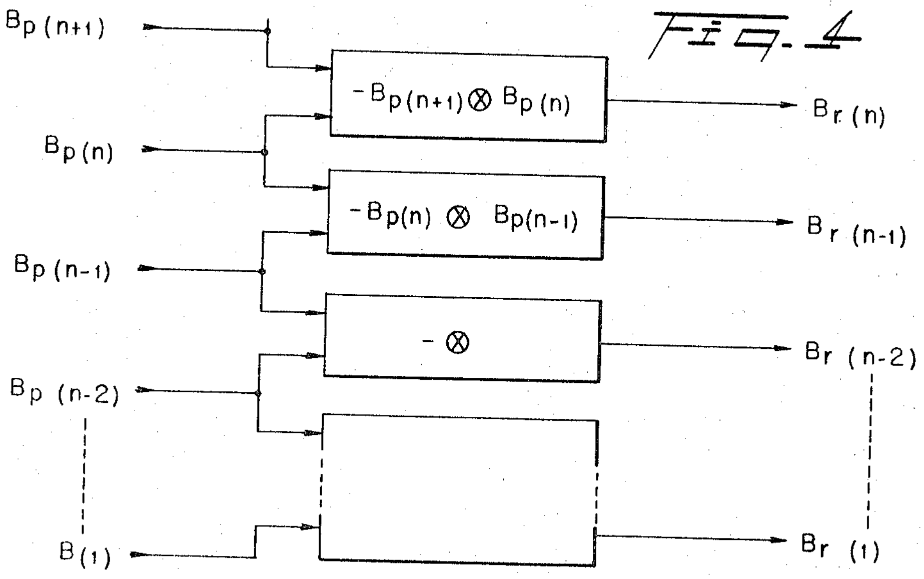

This conversion is very rapid and may be carried out with circuitry illustrated in FIG. 4, wherein each rectangle represents a circuit as illustrated in FIG. 1, and one such circuit is assigned to each of the digits $B_{p(n+1)}$, $B_{p(n)}$, $B_{p(n-1)}$, etc., of the pure or straight binary number. The digit of rank $(n+1)$ in a binary number $B_p$ is necessarily 0.

The reversal of the last-mentioned conversion; that is, the conversion of a reflected binary number into a pure binary, may also be carried out by circuits embodying the invention, the law of such conversion being given by the following relationship:

$$B_{p(n)}=B_{p(n+1)}\otimes B_{r(n)}$$

Figure 5:
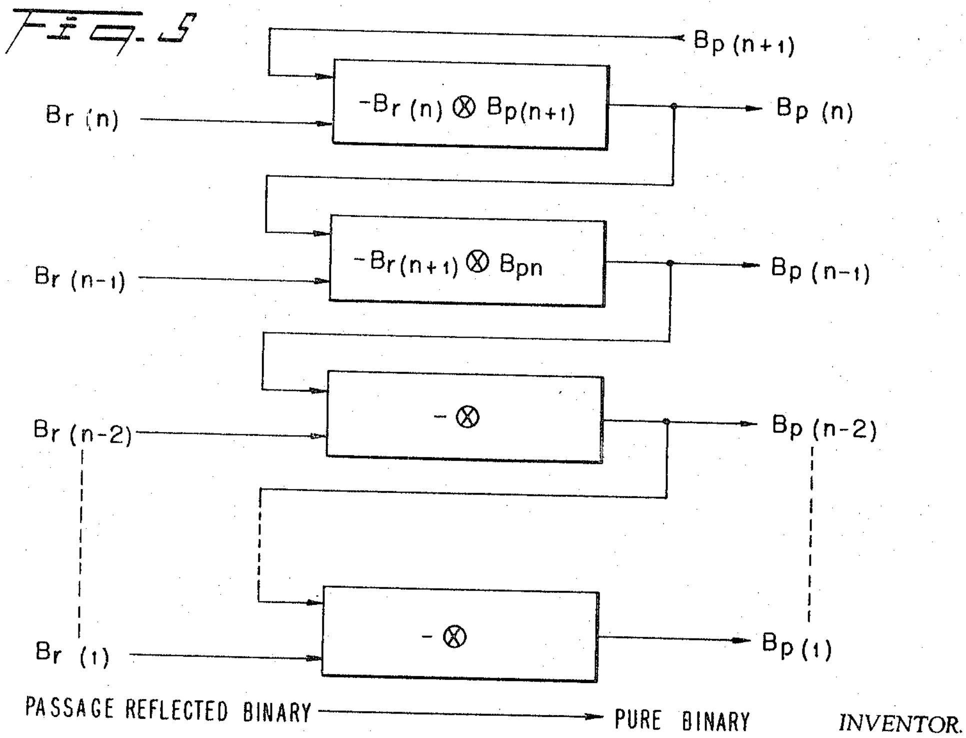

For carrying out this conversion, a plurality of comparator circuits embodying the invention and diagrammatically represented by rectangles are associated and connected as illustrated in FIG. 5. This conversion is less rapid than the reverse thereof in view of the fact that the result or output for each digit depends upon the output for the preceding digit.

The foregoing circuits which illustrate uses of the invention and have been discussed merely by way of example embody primarily only the comparator circuit of the invention. Such circuits may also be advantageously combined with other circuits or components to perform still other useful operations. For example, such comparator circuits may be used in conjunction with commutator circuits as disclosed in applicant's co-pending application for U.S. Ser. No. 442,592, filed Mar. 25, 1965.

Figure 6:
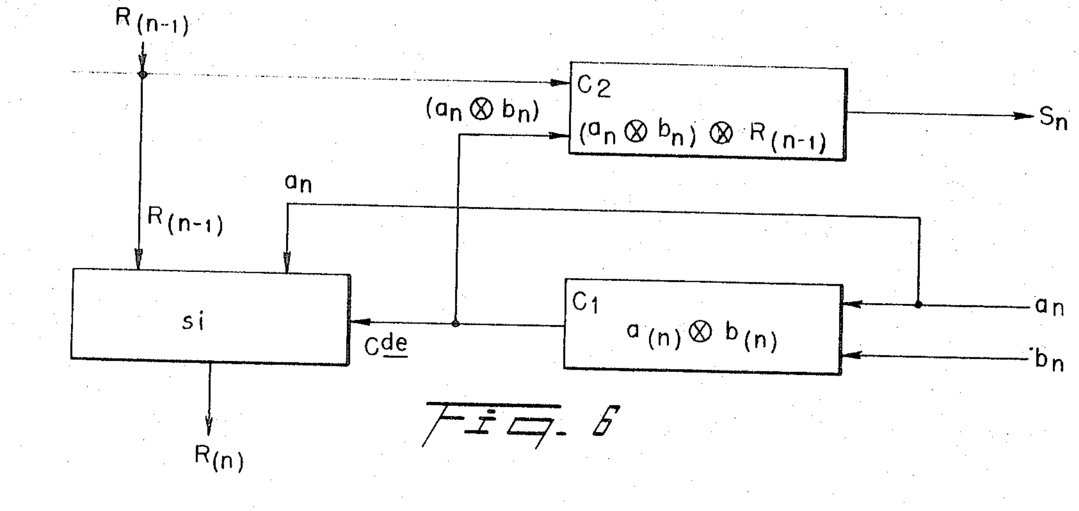

One such advantageous combination of commutator and comparator circuits is illustrated in FIG. 6, wherein a commutator circuit *si* and two comparator circuits $C_1$ and $C_2$ are diagrammatically represented as rectangles. The combined circuits thus represented may be regarded as a parallel binary adding circuit for carrying out the arithmetical operation $A+B=S$. For the digit position $n$ this operation is tantamount to the addition of the carry-over $R_{n-1}$ (of position $n-1$) to the digits $a_n$ and $b_n$ (of position $n$) of binary numbers A and B, respectively, in accordance with the following table of addition, wherein binary 0 may also be indicated by − and binary 1 by +:

| | | | | | | | | |
|---|---|---|---|---|---|---|---|---|
| $a_n$ | 0 / − | 1 / + | 0 / − | 1 / + | 0 / − | 1 / + | 0 / − | 1 / + |
| $b_n$ | 0 / − | 0 / − | 1 / + | 1 / + | 0 / − | 0 / − | 1 / + | 1 / + |
| $R_{n-1}$ | 0 / − | 0 / − | 0 / − | 0 / − | 1 / + | 1 / + | 1 / + | 1 / + |
| $s_n$ | 0 / − | 1 / + | 1 / + | 0 / − | 1 / + | 0 / − | 0 / − | 1 / + |
| $R_n$ | 0 / − | 0 / − | 0 / − | 1 / + | 0 / − | 1 / + | 1 / + | 1 / + |

The foregoing table is summarized by the following two equations:

$$S_n=a_n\otimes b_n\otimes R_{n-1}$$

$$R_n=\begin{cases}a_n & \text{if } a\otimes b=0 \text{ or} -;\ (a=b)\\ R_{n-1} & \text{if } a\otimes b=1 \text{ or} +;\ (a\neq b)\end{cases}$$

These equations are of remarkable simplicity in comparison to those resulting from the exclusive application of the logical AND or logical OR operations of Boolean algebra.

A detailed practical example of one stage of the combined commutator (*si*) and comparator ($C_1$ and $C_2$) circuits illustrated in FIG. 6 for carrying out the foregoing parallel addition is illustrated in FIG. 7, wherein suitable transistor amplification is provided for the output of the comparator circuits. The commutator circuit *si* comprises two transistors, one of PNP type and the other of NPN type, having the collector of said one connected to the emitter of said other transistor and having the base terminals thereof connected through resistances of equal value to the output terminal of comparator circuit $C_1$ which is also connected to one of the input terminals of comparator circuit $C_2$. Digits $a_n$ and $b_n$ are compared in circuit $C_1$ and the result or output is then compared with the carry-over $R_{n-1}$, if any, from the previous stage to supply the result $S_n$. The inputs $a_n$, $b_n$, and $R_{n-1}$ as well as the outputs $S_n$ and $R_n$ may be connected, in accordance with the needs of the application, either to other commutator or comparator circuits or to complemented symmetrical base circuits (monostable balance, etc.) of the type illustrated in FIG. 8(*a*), or to logical base circuits of the type illustrated in FIG. 8(*b*), or to circuit breaker or change-over circuits of the type illustrated in FIG. 8(*c*).

In the circuit of FIG. 7 the following conventions were adopted:

Binary digit 1 is represented by the voltage $+4V_b/5$
Binary digit 0 is represented by the voltage $0V_b$ All points of neutral potential are preferably interconnected, and all supply lines feeding voltages such as $V_b$ are connected in parallel. Inasmuch as the digits are comparatively defined, the feed voltage may vary within wide limits, for instance, from the ordinary to the triple value.

An important advantage of the combined circuitry of FIG. 7 is that there is not any propagation time for the carry-over. This results from the fact that the commutator circuits *si* are responsive only to the values of *a* and $b$ upon receipt of the carry-over R from the preceding stage. It will be understood that although only a single stage for handling one set of corresponding digits of the binary numbers being added is shown in FIGS. 6 and 7, a series of such stages having the commutator circuits *si* connected in series will be required for adding binary numbers having a multiplicity of digits. A further advantage is that in this circuitry, only a single wire is required for each digit, since there is no need for recourse to blocking values. The comparator circuit embodying the invention permits passage, without ambiguity and under very low impedance, of the voltages represented by the binary symbols 1 and 0.

Comparator circuits embodying the invention may also be utilized in a simplified system for detecting the similarity or dissimilarity of two binary numbers. For this purpose, one such comparator circuit is provided to compare each set of two digits having corresponding rank or position in two binary numbers A and B, and a known AND circuit is added to these comparator circuits. One can thus detect whether there is similarity of digits for all ranks or positions. If so, one will have $A=B$.

In practice, it is often of interest also to detect or determine whether one of two binary numbers A and B is greater than the other. A circuit for determining such dissimilarity, that is, whether $A>B$, is somewhat more complex than the similarity detector circuit explained above, but is often indispensable. In such a circuit, the operation $A+\overline{B}$, where $\overline{B}$ is "not B," is perfomed and the symbol representing the carry-over $R_{n+1}$ is noted if $$R_{n+1}=1 \; A>B$$
$$R_{n+1}=0 \; A\leqslant B$$

This operation may be performed by a system combining commutator circuits *si* (see FIG. 7) and comparator circuits embodying the present invention in accordance with the diagram of FIG. 9, one set of such circuits being provided and connected as illustrated for each set of corresponding digits $a$ and $b$ of the binary numbers being compared. Corresponding values $a$ and $\overline{b}$ are fed to the inputs of the comparator circuits. The system thus provided is essentially an adding device for the corresponding digits of the numbers being compared wherein one need not be concerned with feeding a carry-over into the comparator circuits.

Although only a limited number of embodiments of the invention have been illustrated in the accompanying drawings and described in detail in the foregoing specification, it is to be expressly understood that the invention is not limited thereto. The circuitry of the invention may be put to other uses, and various changes may be made in the details of the circuitry to adapt the invention to such uses and for use with other associated circuit components, as will now be apparent to those skilled in the art.

What is claimed is:

1. An electronic logic circuit comprising a transistor having a collector, an emitter and a base, a source of voltage, means including a resistor connecting said collector to one terminal of said source, means including a resistor connecting said emitter to the other terminal of said source, said resistors being of substantially equal resistance value, an output terminal connected to at least one of said collector and emitter, and a pair of resistors connected in parallel to said base and each to a separate input terminal, the resistors of said pair having substantially equal resistance values which are low in comparison to the resistance value of said first-named resistor.

2. An electronic logic circuit as defined in claim 1 having an output terminal connected to each of said emitter and collector.

3. An electronic logic circuit as defined in claim 1 wherein the resistance value of said first-named resistor is at least twice as great as the resistance value of each resistor of said pair.

4. An electronic logic circuit as defined in claim 1 wherein said collector is connected to the high potential terminal of said source.

5. An electronic logic circuit as defined in claim 4 comprising means for applying alternating current voltage to each said input terminal, whereby the direct current voltage at the output terminal is representative of the phase relationship of said alternating current voltages.

6. An electronic logic circuit comprising two input terminals and an output terminal, a solid state conduction control device having collector, emitter and control electrodes, means including a resistor for connecting said control electrode to each of said input terminals, a resistor directly connected to said collector electrode, a resistor directly connected to said emitter electrode, each of said two last-named resistors having large resistance values in comparison to the resistance value of each of said resistors connected between said control electrode and said input terminals, means connecting at least one of said emitter and collector electrodes to said output terminal, and a source of voltage connected across said collector and emitter electrodes and the resistors connected thereto.

7. An electronic logic circuit as defined in claim 6 wherein said resistors connected to said collector and emitter electrodes are of substantially equal resistance value.

8. An electronic logic circuit as defined in claim 6 wherein said resistors connected to said control electrode have substantially equal resistance values.

9. An electronic logic circuit as defined in claim 6 wherein the resistance value of each of the resistors connected to said emitter and collector electrodes is approximately 30,000 ohms.

10. An electronic logic circuit as defined in claim 6 wherein the resistance value of each of the resistors connected to said control electrode is approximately 15,000 ohms.

11. In an electronic device for determining the similarity or dissimilarity of two binary numbers, the combination of a voltage comparator circuit having two input terminals and an output terminal and a commutator circuit having two input terminals, a control voltage terminal and an output terminal, means for applying a voltage symbolically representative of a digit of given rank in one of said numbers to one input terminal of each of said circuits, means for applying to the other input terminal of the comparator circuit a voltage representative of the contrary of the digit of corresponding rank in the other of said numbers, means connecting the output terminal of said comparator circuit to the control voltage terminal of said commutator circuit, means for generating a voltage symbolically representative of the carry-over resulting from the addition of digits of lower rank than the aforesaid digits of said numbers, and means for applying said last-named voltage to the other input terminal of said commutator circuit.

12. An electronic device as defined in claim 11, wherein said comparator circuit comprises a transistor having a collector, an emitter and a base, means including a resistor connecting said collector to one terminal of a source of electrical energy, means including a resistor connecting said emitter to the other terminal of said source, said resistors being of substantially equal resistance value, an output terminal connected to said collector, and a pair of resistors connected in parallel to said base and each to a separate input terminal, the resistors of said pair having substantially equal resistance values, said values being low in comparison to the resistance value of said first-named resistor.

13. An electronic device as defined in claim 11, wherein said commutator circuit comprises two transistors, one of said transistors being of the PNP type and the other being of the NPN type, the collector of one transistor being connected to the emitter of the other transistor and the bases of said transistors being connected each through a resistor to said control voltage terminal, said last-named resistors being of substantially equal value.

14. An electronic logic circuit constituted by a transistor having an emitter, a collector and a base, a source of electrical energy, a first resistor having the ends thereof connected directly to said collector and a terminal of said source, a second resistor having the ends thereof connected directly to said emitter and the opposite terminal of said source, a pair of resistors having identical resistance value and each having an end thereof connected directly to said base and the other end thereof connected directly to a signal input terminal, the resistance value of each resistor of said pair being less than the resistance value of either of said first and second resistors, and an output terminal connected directly to one of said emitter and collector.

References Cited

UNITED STATES PATENTS

| | | | |
|---|---|---|---|
| 2,956,182 | 10/1960 | Norman | 307—88.5 |
| 3,093,751 | 6/1963 | Williamson | 307—88.5 |
| 3,194,974 | 7/1965 | Rymaszewski | 307—88.5 |

MALCOLM A. MORRISON, *Primary Examiner.*

M. J. SPIVAK, *Assistant Examiner.*